United States Patent
Liu

(10) Patent No.: US 8,363,635 B2
(45) Date of Patent: Jan. 29, 2013

(54) METHOD AND SYSTEM FOR REDUCING POWER CONSUMPTION OF SIGNAL SYNCHRONIZATION

(75) Inventor: Jung-Jen Liu, Uxbridge, MA (US)

(73) Assignee: Wei Chi Liu, Uxbridge, MA (US)

( * ) Notice: Subject to any disclaimer, the term of this patent is extended or adjusted under 35 U.S.C. 154(b) by 1017 days.

(21) Appl. No.: 12/194,673

(22) Filed: Aug. 20, 2008

(65) Prior Publication Data

US 2010/0046685 A1    Feb. 25, 2010

(51) Int. Cl.
*H04J 3/06* (2006.01)

(52) U.S. Cl. ... 370/350; 370/503; 370/324; 370/395.62; 375/354; 375/357; 375/364; 375/359

(58) Field of Classification Search .................. None
See application file for complete search history.

(56) References Cited

U.S. PATENT DOCUMENTS

| | | | |
|---|---|---|---|
| 5,596,582 A * | 1/1997 | Sato et al. | 370/509 |
| 5,602,835 A * | 2/1997 | Seki et al. | 370/206 |
| 6,768,714 B1 | 7/2004 | Heinonen | |
| 6,889,055 B1 | 5/2005 | Neufeld | |
| 7,346,131 B2 * | 3/2008 | Galperin et al. | 375/343 |
| 7,412,016 B2 * | 8/2008 | Stojanovic | 375/355 |
| 7,526,021 B2 * | 4/2009 | Johansson et al. | 375/229 |
| 7,634,034 B2 * | 12/2009 | Larsson | 375/362 |
| 2007/0025457 A1 | 2/2007 | Wang | |

* cited by examiner

*Primary Examiner* — Kibrom T Hailu
*Assistant Examiner* — Zewdu A Beyen
(74) *Attorney, Agent, or Firm* — Wei Chi Liu

(57) ABSTRACT

A method and system for reducing power consumption of OFDM (Orthogonal Frequency Division Multiplexing) signal synchronization circuit comprises a sync setting, a sync controller, a sync pipeline and a data corrector. The sync setting dynamically changes correlation data sample rate based on synchronization statuses and results. The sync controller controls and schedules frame and symbol synchronizations, and turns on and off the sync pipeline based on synchronization activities. The sync pipeline integrates frame and symbol synchronization operations, synchronizes receiving signal with scalable synchronization window, synchronization sequence length, synchronization delay and variable data sample rate. Data corrector adjusts input data with coarse timing and fine frequency offsets estimated in sync pipeline, and generates corrected output data for further processing. By using the above techniques, the power consumption of signal synchronization circuit is reduced.

16 Claims, 12 Drawing Sheets

METHOD AND SYSTEM FOR REDUCING POWER CONSUMPTION OF SIGNAL SYNCHRONIZATION

CROSS-REFERENCE TO RELATED APPLICATION

Not applicable

FEDERALLY SPONSORED RESEARCH

Not applicable

FIELD OF THE INVENTION

The invention relates to digital communication system, and more particularly, to a method and system for reducing power consumption of OFDM signal synchronization circuit.

BACKGROUND OF THE INVENTION

OFDM system is widely used in wireless communication such digital audio broadcasts (DAB), digital video broadcasts (DVB), wireless local area network (WLAN) and long term evolution (LTE) system. To guarantee the reliability of the communication, OFDM signal correlation and synchronization in timing and frequency are performed in a receiver. The term "correlation" refers to an operation of detecting similarity between two signal samples. The term "synchronization" refers to all operations for detecting similarity between two signal samples that includes controlling data flow, scheduling tasks, sampling and correlating the signal samples. Correlation is a part of synchronization process.

One of the common practices in timing and frequency synchronizations is to transmit a pair of redundant synchronization sequence along with data. The sequences are correlated at a receiving side to detect a starting point of receiving data. Generally, timing and frequency synchronization is accomplished at multiple levels. The synchronization may start at superframe level, continue at frame level and complete at symbol level. The length of the synchronization sequence, synchronization window, synchronization delay, data sample rate and other characteristics may vary at every level, but the same synchronization principles apply to all levels.

In general, OFDM signal is organized into hierarchy as shown in FIG. 1. At the top of the hierarchy, a signal sequence is grouped into superframes 100. A superframe 100 may have a superframe header 101 and a predetermined number of frames 102. A frame 102 may have a frame header (HD) 104 and a predetermined number of symbols 106. The header 104 comprises of a frame identifier (FID) 108, a pair of redundant synchronization (sync) sequences 110, and may have other data interval 112 in between. The two identical sync sequences 110 are correlated in a receiver to detect the starting point of a frame 102. Symbol 106 comprises of cyclic prefix (CP) 114 and data payload 116. Data payload 116 includes regular data 118 and cyclic prefix data 114a. Cyclic prefix 114 is an exact replication of cyclic prefix data 114a. The two identical cyclic prefix 114 sequences are correlated in a receiver to detect the starting point of a symbol 106. Cyclic prefix 114 also serves as a guard interval to prevent interference between neighboring symbols. The coarse timing and fine frequency synchronizations of OFDM signal are accomplished by correlating sync sequences 110 at frame level and correlating cyclic prefixes 114 at symbol level.

FIG. 2 shows the timing of frame header 104 and cyclic prefix 114 in a superframe 100. Header 104 and cyclic prefix 114 consume about 15% or less of the full bandwidth. Synchronization process starts when a valid signal is detected and continues until the end of data stream. In general, sync sequences 110 are correlated first to detect the beginning of a frame 102. Then, cyclic prefixes 114 are correlated to detect the beginning of every symbol 106 in a frame 102. The cyclic prefix 114 correlations continue until all symbols 106 in a frame 102 are processed. In conventional practices, due to different in synchronization window size, synchronization delay and synchronization sequence length at frame and symbol levels, dedicated devices are implemented for synchronization at each level. However, in mobile communication where cost is highly competitive, it is desirable to provide a single integrated device to execute synchronizations at all levels to reduce component cost and power consumption.

Further, in conventional practices, due to uncertainty of header 104 and cyclic prefix 114 timing; synchronization and correlation are kept active during whole data packet cycle. This practice may not be efficient in power consumption during synchronization, since correlation is only part of the synchronization process. Therefore, it is desirable to power off the correlation circuits to reduce power consumption when data correlation is complete during synchronization.

Further, in the known prior art, data sample rate for correlation is predetermined to be equivalent to the incoming data rate. In general, power consumption is proportion to data sample rate, and sample quality (signal to noise ratio S/N) is related to channel conditions that change dynamically. Therefore, to reduce power consumption, it is desirable to decrease the sample rate when channel S/N is high and increase the sample rate when the channel S/N is low dynamically during synchronization.

Hence, it is an object of this invention to provide an improved method and system that is capable to process multiple levels of timing and frequency synchronizations with a single integrated device and to control the power consumption of the system according to correlation and synchronization activities. It is another object of this invention to provide an improved method and system that reduce system power consumption by changing correlation data sample rate dynamically according to communication channel conditions.

SUMMARY OF THE INVENTION

According to one embodiment of the present invention, a method and system for reducing power consumption during OFDM signal synchronizations, especially in coarse timing and fine frequency synchronizations, in a receiver includes a control register, a sync setting, a sync controller, a sync pipeline, a data buffer and a data corrector. The present embodiment processes, but is not limited to, two levels of synchronization to receiving data. At the frame level, sync sequences of a frame header are correlated. At the symbol level, cyclic prefixes of a symbol are correlated. Coarse timing and fine frequency offsets are estimated during the correlation.

The control register stores parameters for the timing and frequency synchronization. The control register may be written and read from the external source. Sync setting changes the correlation data sample rate and modifies the parameter setting according to current synchronization requirements, statuses, and results. Sync controller controls the operation flow of the synchronization. Initially, sync controller is in idle state and is activated after receiving packet start signal. When activated, sync controller starts frame synchronization and enters to sleep mode after the frame synchronization is complete. Sync controller starts symbol synchronization when awaken by a timer and enters to sleep mode when the symbol synchronization is complete. Sync controller continues to perform frame or symbol synchronizations until all receiving data has been processed. When sync controller is in sleep mode, sync pipeline is powered down to reduce power consumption. Receiving input data is stored in data buffer and is sent to sync pipeline. Sync pipeline correlates the receiving data to estimate coarse timing and fine frequency offsets of frames or symbols. Sync pipeline changes the data sample rate according to parameters set in sync setting. Sync pipeline is powered on and off by sync controller to control power consumption during synchronization. By applying the timing and frequency offsets estimated in sync pipeline, data corrector corrects the frame and symbol timing and frequency in the receiving data, and output the data to downstream modules for other processing.

DESCRIPTION OF THE PREFERRED EMBODIMENTS

Figure 1:
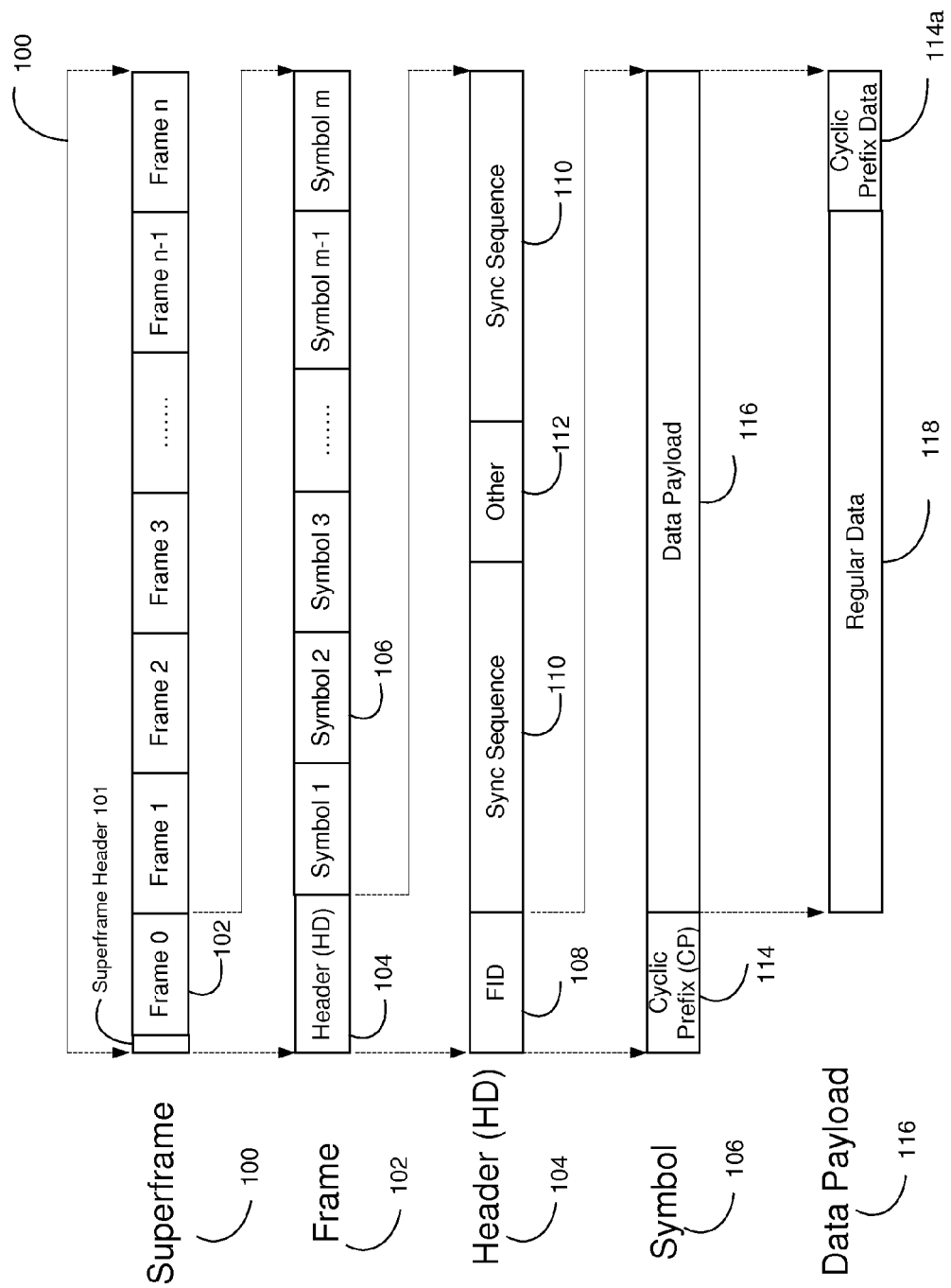
FIG. 1 is a hierarchical diagram of a general OFDM signal.
Figure 2:
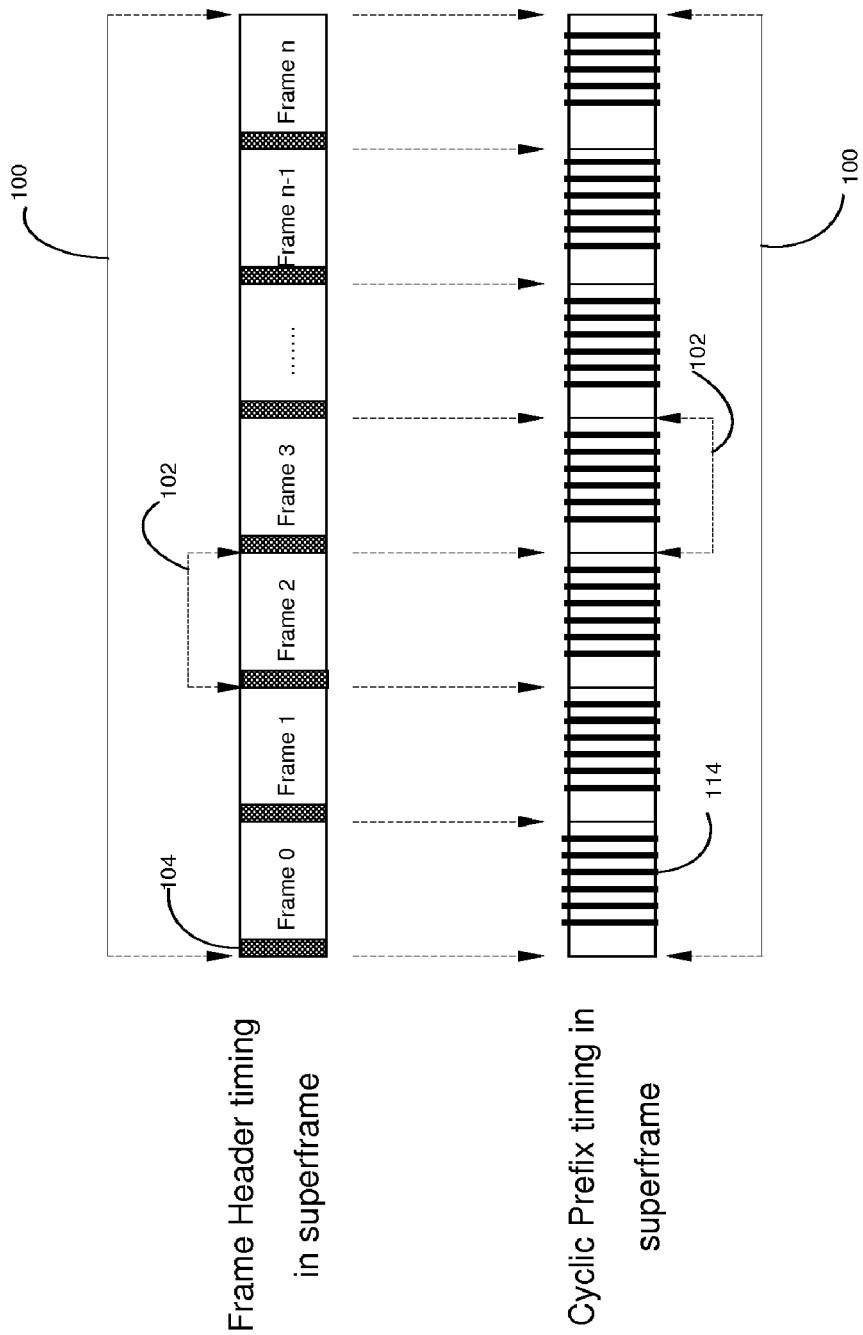
FIG. 2 is a timing diagram of frame header and symbol cyclic prefix in a superframe.

Referring to the drawings, a method and system for reducing power consumption of OFDM signal synchronization circuit in a receiver, according to one embodiment of the present invention, is explained.

Figure 4:
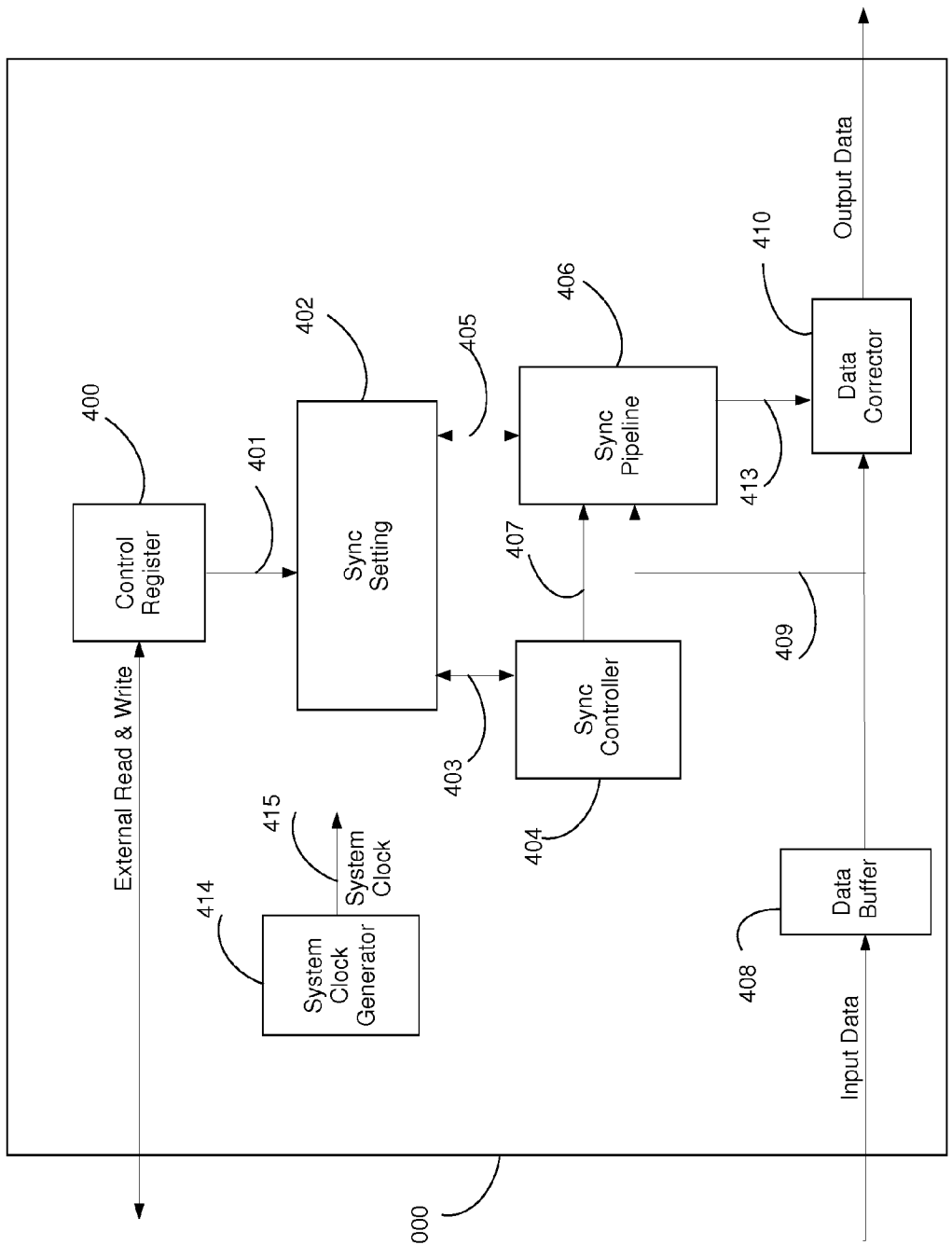
FIG. 4 is a block diagram for one embodiment of low power synchronization system, according to the present invention.

FIG. 4 is a block diagram showing one embodiment of the present invention. A low power synchronization system 000 for OFDM signal includes a control register 400, a sync setting 402, a sync controller 404, a sync pipeline 406, a data buffer 408, a data corrector 410 and a system clock generator 414. The control register 400 stores parameters for timing and frequency synchronizations. The control register 400 may be written and read from the external source (not shown).

Figure 3A:
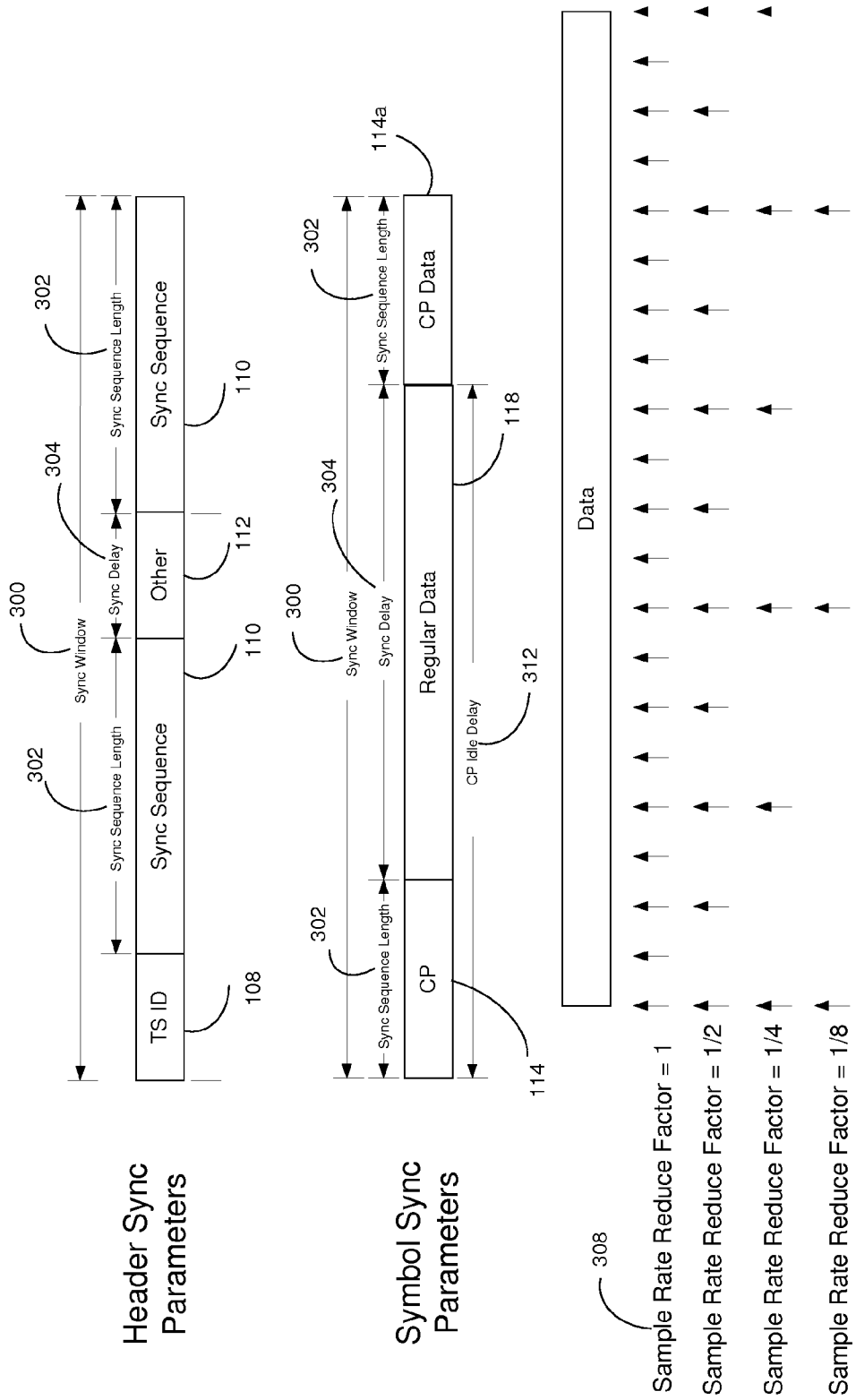
FIG. 3a is diagram showing some parameters used for one embodiment according to the present invention.
Figure 3B:
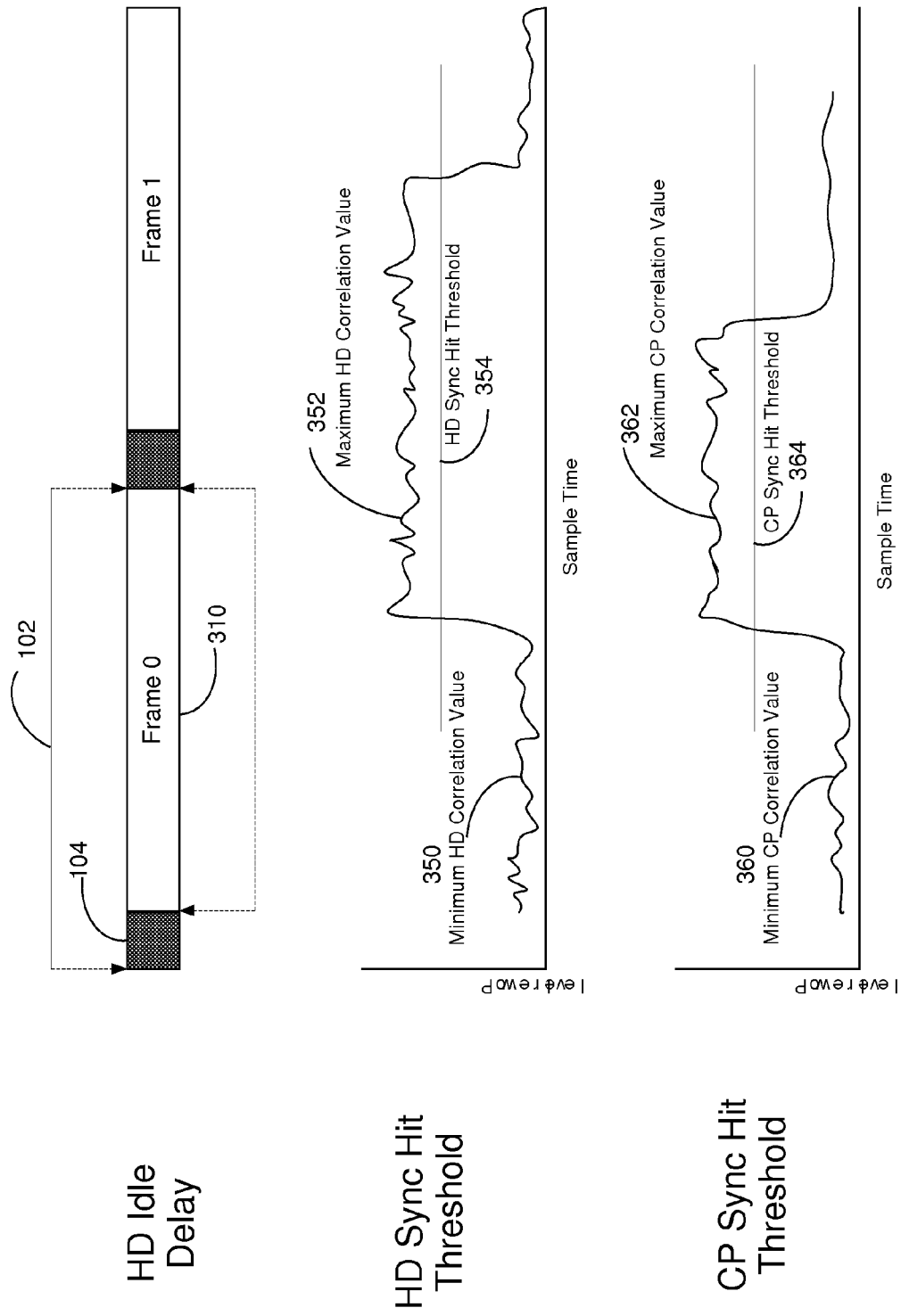
FIG. 3b is diagram showing more parameters used for one embodiment according to the present invention.

FIG. 3a and FIG. 3b show some of the parameters used in the present embodiment. The parameter includes, but is not limited to, sync window 300, sync sequence length 302, sync delay 304, sample rate reduce factors 308, CP idle delay 312, as shown in FIG. 3a, HD idle delay 310, HD sync hit threshold 354 and CP sync hit threshold 364, as shown in FIG. 3b.

Sync sequence length 302 is a predetermined number of samples in sync sequence 110. The sample may represent an integer number, a float point number or a complex number in a bit string format. Sync sequence length 302 may indicate duration of time for transporting a sync sequence 110 in the system. Sync delay 304 is a predetermined number of samples between two sync sequences 110 in a header 104, or between two cyclic prefixes 114 in a symbol 106. Sync window 300 is the full length of a header 104 or symbol 106 and is the range for data correlation.

During correlation, the input data is sampled with a predetermined sample rate. The sample rate may be reduced by a factor defined as sample rate reduce factor 308. The sample rate reduce factor 308 may be, but is not limited to, 1, ½, ¼ and ⅛. HD idle delay 310 is duration from completion of frame synchronization to the beginning of next frame synchronization. CP idle delay 312 is duration from completion of symbol synchronization to the beginning of next symbol synchronization. HD sync hit threshold 354 is average power level when two sync sequences 110 are matched during frame synchronization. CP sync hit threshold 364 is average power level when two cyclic prefixes 114 are matched during symbol synchronization.

The present embodiment processes, but is not limited to, two levels of synchronization to receiving data. At the frame level, two sync sequences 110 within a frame header 104 are correlated. At the symbol level, two cyclic prefixes 114 within a symbol are correlated. Coarse timing and fine frequency offsets are estimated during the correlation. Sync setting 402 modifies the parameter setting according to current synchronization requirements and statuses. During the synchronization, sync setting 402 monitors the synchronization results and update the data sample rate accordingly, as will be discussed in detail later.

Sync controller 404 controls the operation flow of the synchronization. Initially, sync controller 404 is in idle state and is activated after receiving packet start signal. When activated, sync controller 404 starts frame synchronization and enters to sleep mode after the frame synchronization is complete. Sync controller 404 starts symbol synchronization when awaken by a timer and enters to sleep mode when the symbol synchronization is complete. Sync controller 404 continues to perform frame or symbol synchronizations until all receiving data has been processed. When sync controller 404 is in sleep mode, sync pipeline 406 is powered down to reduce power consumption, as will be discussed in detail later.

Receiving input data is stored in data buffer 408 and is sent to sync pipeline 406. Sync pipeline 406 correlates the receiving data to estimate coarse timing and fine frequency offsets of frame 102 or symbol 106. Sync pipeline 406 changes the data sample rate according to parameters set in sync setting 402. Sync pipeline 406 is powered on and off by sync controller 404 to control power consumption during synchronization.

By applying the timing and frequency offsets estimated in sync pipeline 406, data corrector 410 corrects the frame 102 and symbol 106 timing and frequency in the receiving data, and output the data to downstream modules for other processing.

Figure 5:
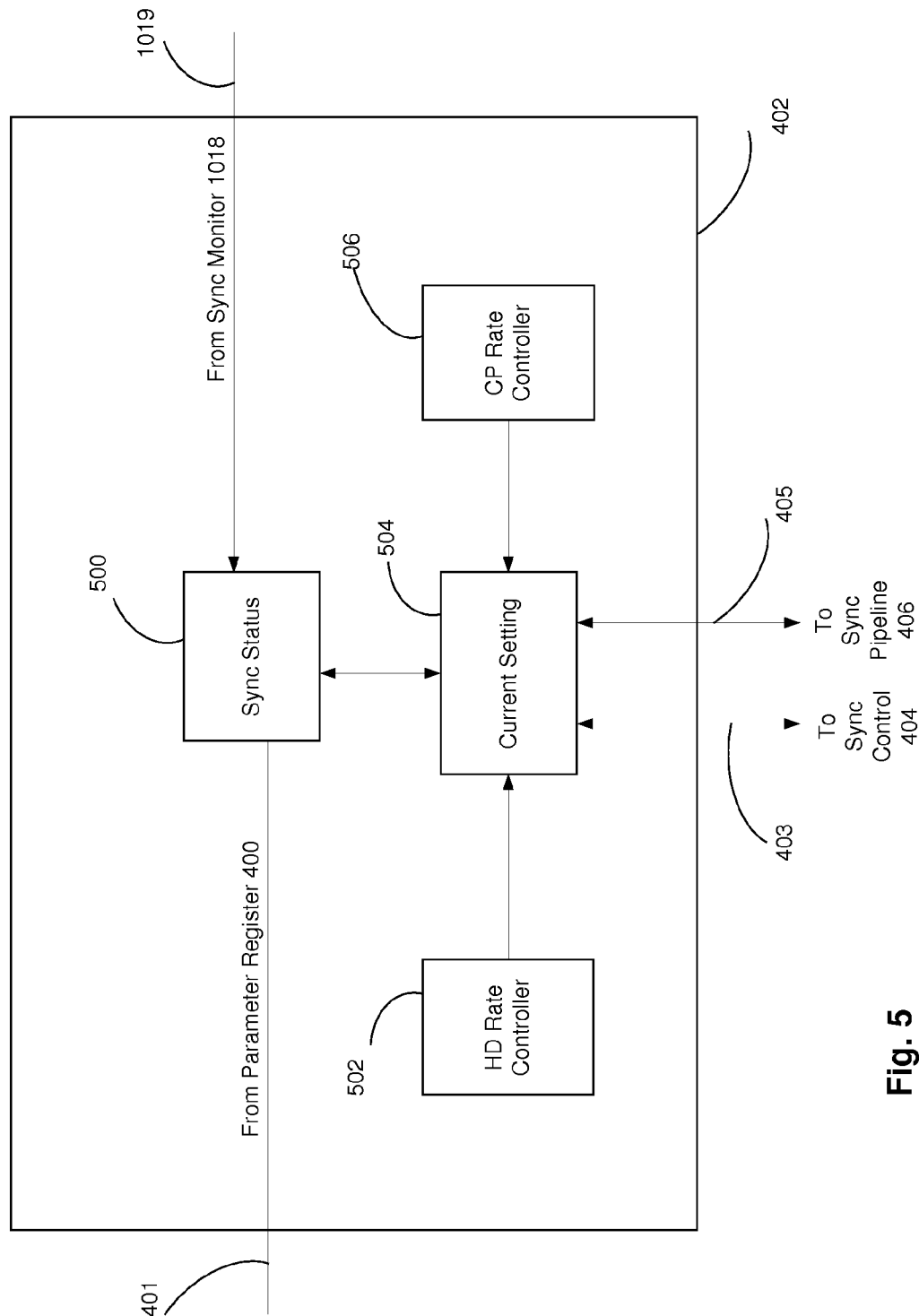
FIG. 5 is a block diagram for one embodiment of sync setting of FIG. 4, according to the present invention.

FIG. 5 is a block diagram for one embodiment of sync setting 402. Sync setting 402 includes, but is not limited to, sync status 500, HD rate controller 502, current setting 504 and CP rate controller 506. Sync status 500 stores statuses of the system. Sync status 500 monitors operations of sync controller 404 and sync pipeline 406, and modifies the statuses accordingly. Further, sync status 500 calculates the averages of timing and frequency offsets from a plurality of previous symbol synchronizations for criteria to skip symbol synchronization in sync control state machine 606. HD rate controller 502 adjusts data sample rate dynamically according to the synchronization statuses and results during frame synchronization. The sample rate is increased by a factor equal to invert of sample rate reduce factor 308 when a synchronization operation fails to detect a sync sequence 110 (a miss). When synchronization operation successfully detects a sync sequence 110 (a hit) in the previous predetermined number of frame synchronizations, the sample rate is decreased by a factor equal to sample rate reduce factor 308.

Similar to HD rate controller 502, CP rate controller 506 adjusts data sample rate dynamically according to the synchronization statuses and results during symbol synchronization. The sample rate is increased by a factor equal to invert of sample rate reduce factor 308 when a synchronization operation fails to detect a CP 114 (a miss). When synchronization operation successfully detects a CP 114 (a hit) in the previous predetermined number of symbol synchronizations, the sample rate is decreased by a factor equal to sample rate reduce factor 308. Current setting 504 updates the parameters and sample rates for current synchronization operation according to the latest statuses from sync status 500, HD rate controller 502 and CP rate controller 506.

Figure 6:
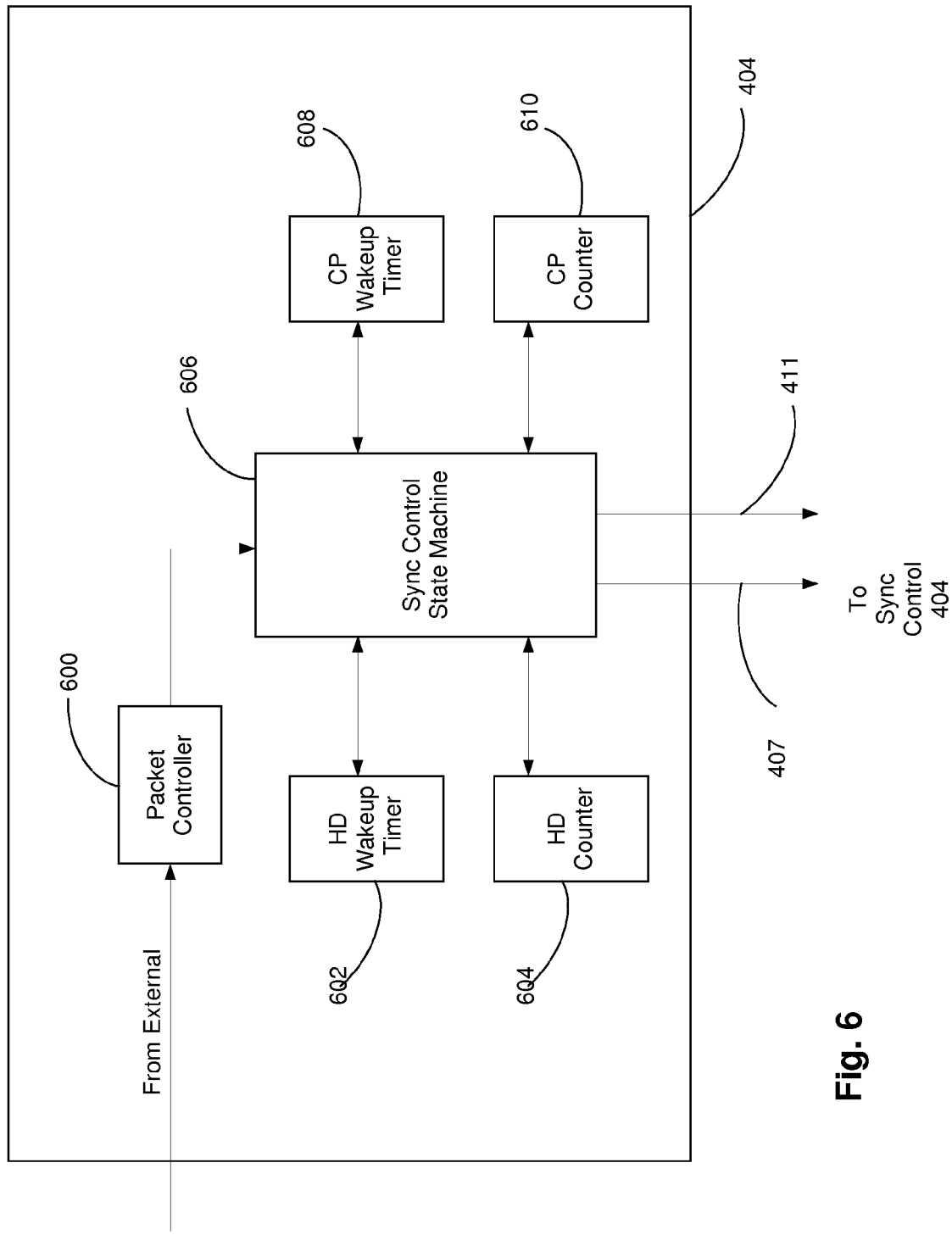
FIG. 6 is a block diagram for one embodiment of sync controller of FIG. 4, according to the present invention.

FIG. 6 is a block diagram for one embodiment of sync controller 404. Sync controller 404 includes, but is not limited to, a packet controller 600, a HD wakeup timer 602, a HD counter 604, a sync control state machine 606, a CP wakeup timer 608 and a CP counter 610. Packet controller 600 monitor receiving data and generates a packet start signal to starts the system. A packet end signal is generated when packet controller 600 detects the packet is ended.

Sync control state machine 606 controls and schedules all synchronization operations. Sync control state machine 606 starts frame synchronization after receiving packet start signal from packet controller 600. When frame synchronization is complete, sync control state machine 606 activates and sets HD wakeup timer 608 with HD idle delay 310, and switches to symbol synchronization. Sync control state machine 606 continues with symbol synchronization. When symbol synchronization is complete, sync control state machine 606 turns off sync pipeline 406, activates and sets CP wakeup timer 608 with CP idle delay 312. Sync control state machine 606 wakes up and turns on sync pipeline 406 when CP wakeup timer 608 expires. Sync control state machine 606 continues to execute symbol synchronization until HD wakeup timer 602 expires or all symbols in the frame have been synchronized, and when it occurs, sync control state machine 606 starts another frame synchronization. The cycle repeats until all data stream has been processed.

Whenever frame synchronization is complete, sync control state machine 606 activates and sets HD wakeup timer 602 with HD idle delay 310, and powers off the sync pipeline 406 to reduce power consumption. HD wakeup timer 602 wakes up sync control state machine 606 to start a next frame synchronization when the timer expires. Sync control state machine 606 powers on the sync pipeline 406 and processes the next frame synchronization.

Whenever symbol synchronization is complete, sync control state machine 606 activates and sets CP wakeup timer 608 with CP idle delay 312, and powers off the sync pipeline 406 to reduce power consumption. CP wakeup timer 608 wakes up sync control state machine 606 to start a next symbol synchronization when the timer expires. Sync control state machine 606 powers on the sync pipeline 406 and performs the next symbol synchronization. Frame counter 604 records the count of frames that have been processed. Symbol counter 610 records the count of symbols that have been processed. Sync control state machine 606 switches to frame synchronization when the symbol count reaches a predetermined number.

Figure 7:
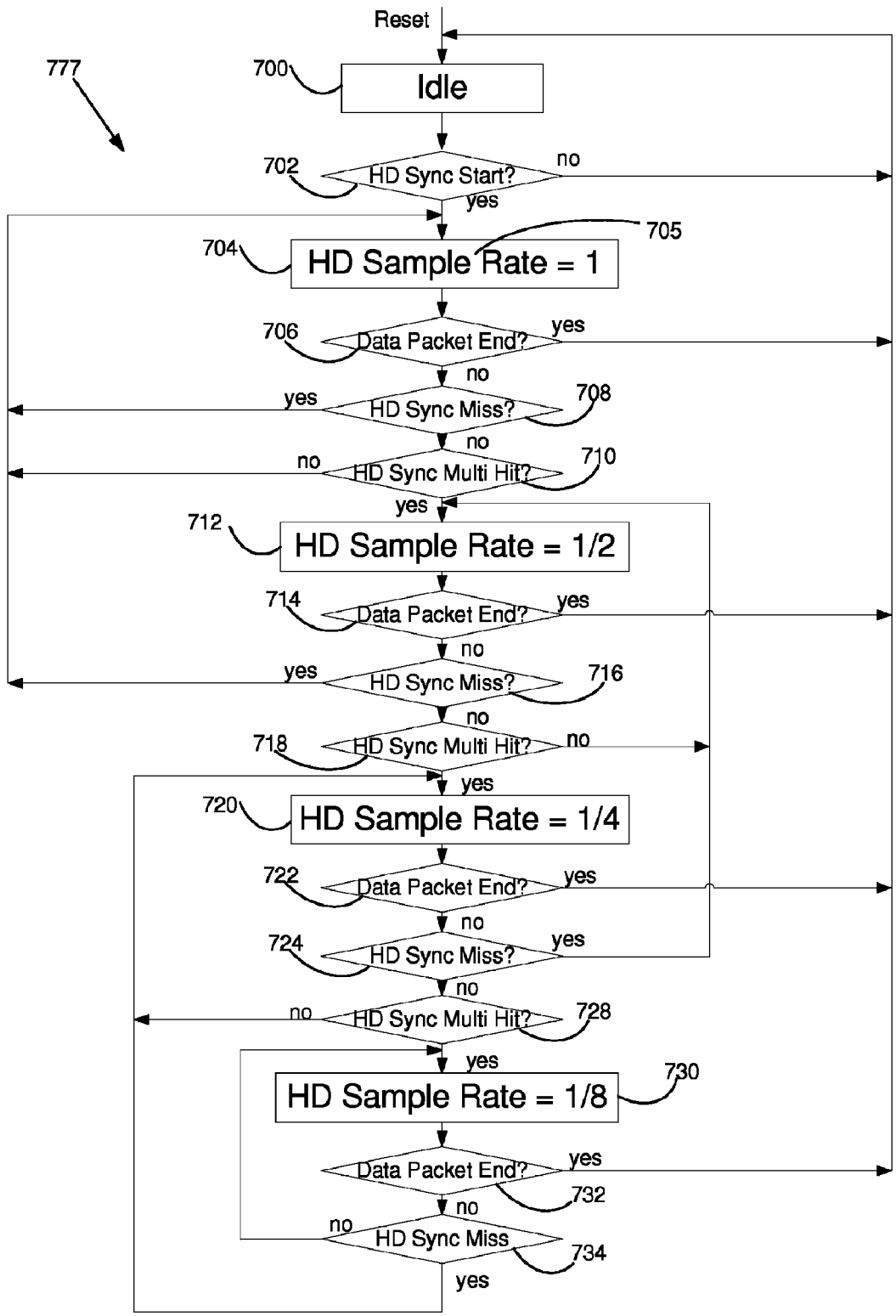
FIG. 7 is a flow chart for one embodiment of HD rate controller of FIG. 5, according to the present invention.

FIG. 7 shows a flowchart method 777 for one embodiment of HD rate controller 502 according to the present invention. The present embodiment uses sample rate reduce factor 308 equal but is not limited to ½ for frame synchronization. The sample rate reduce factor 308 is store in control register 400 and may be changed to any value at any time during synchronization.

Method 777 initially sets HD sample rate 705 equivalent to input data rate, and modifies the sample rate according to frame synchronization statuses dynamically. The sample rate 705 is increased by a factor equal to the invert of sample rate reduce factor 308 whenever the synchronization fails to detect a sync sequence 110 (a miss). However, if a predetermined number of previous synchronizations detects a sync sequence successfully (a multiple hit), then the sample rate 705 decreased by sample rate reduce factor 308.

In step 702, if a start signal from sync control state machine 606 is detected, method 777 proceeds to step 704, a sample rate 705 equivalent to input data rate is set by default. If a start signal is not detected, the method returns to 700. In step 706, method 777 determines weather a packet end signal from packet controller 600 is detected. If the packet end signal is not detected, method 777 proceeds to step 708. However, if the packet end signal is detected, the method returns to step 700. In step 708, method 777 determines weather the synchronization is a miss. If the synchronization is a miss, method 777 returns to step 704. However, if synchronization is a hit, then the method continues with step 710. In step 710, if the synchronization is a multiple hit, method 777 proceeds to step 712. In step 712, the sample rate 705 is reduced by sample rate reduce factor 308, and the sample rate is equal to ½ of the full sample rate in the present embodiment. The method continues with step 704 if the synchronization is not a multiple hit.

In step 714, method 777 determines weather a packet end signal from packet controller 600 is detected. If the packet end signal is not detected, method 777 proceeds to step 716. If the packet end signal is detected, the method returns to step 700. In step 716, method 777 determines weather the synchronization is a miss. If the synchronization is a miss, method 777 returns to step 704 and the sample rate is double in the present embodiment. However, if synchronization is a hit, then the method continues with step 718. In step 718, if the synchronization is a multiple hit, method 777 proceeds to step 720. In step 720, the sample rate is reduced again by sample rate reduce factor 308, and the sample rate is equal to ¼ of the full sample rate in the present embodiment. The method continues with step 712 if synchronization is not a multiple hit.

In step 722, method 777 determines weather a packet end signal from packet controller 600 is detected. If the packet end signal is not detected, method 777 proceeds to step 724. If the packet end signal is detected, the method returns to step 700. In step 724, method 777 determines weather the frame synchronization is a miss. If the synchronization is a miss, method 777 returns to step 712. The sample rate is double in the present embodiment. However, if synchronization is a hit, then the method continues with step 728. In step 728, if the synchronization is a multiple hit, method 777 proceeds to step 730. In step 730, the sample rate is reduced again by sample rate reduce factor 308, and the sample rate is equal to ⅛ of the full sample rate in the present embodiment. The method continues with step 720 if synchronization is not a multiple hit.

In step 732, method 777 determines weather a packet end signal from packet controller 600 is detected. If the packet end signal is not detected, method 777 proceeds to step 734. However, if the packet end signal is detected, the method returns to step 700. In step 734, method 777 determines weather the frame synchronization misses a sync sequence 110. If the synchronization is a miss, method 777 proceeds to step 720. The sample rate is double in the present embodiment. However, if synchronization is a hit, then the method continues with step 730. The minimum sample rate is ⅛ of input data rate in the present embodiment. The sample rate is updated dynamically and constantly until synchronization of the whole packet is complete.

Figure 8:
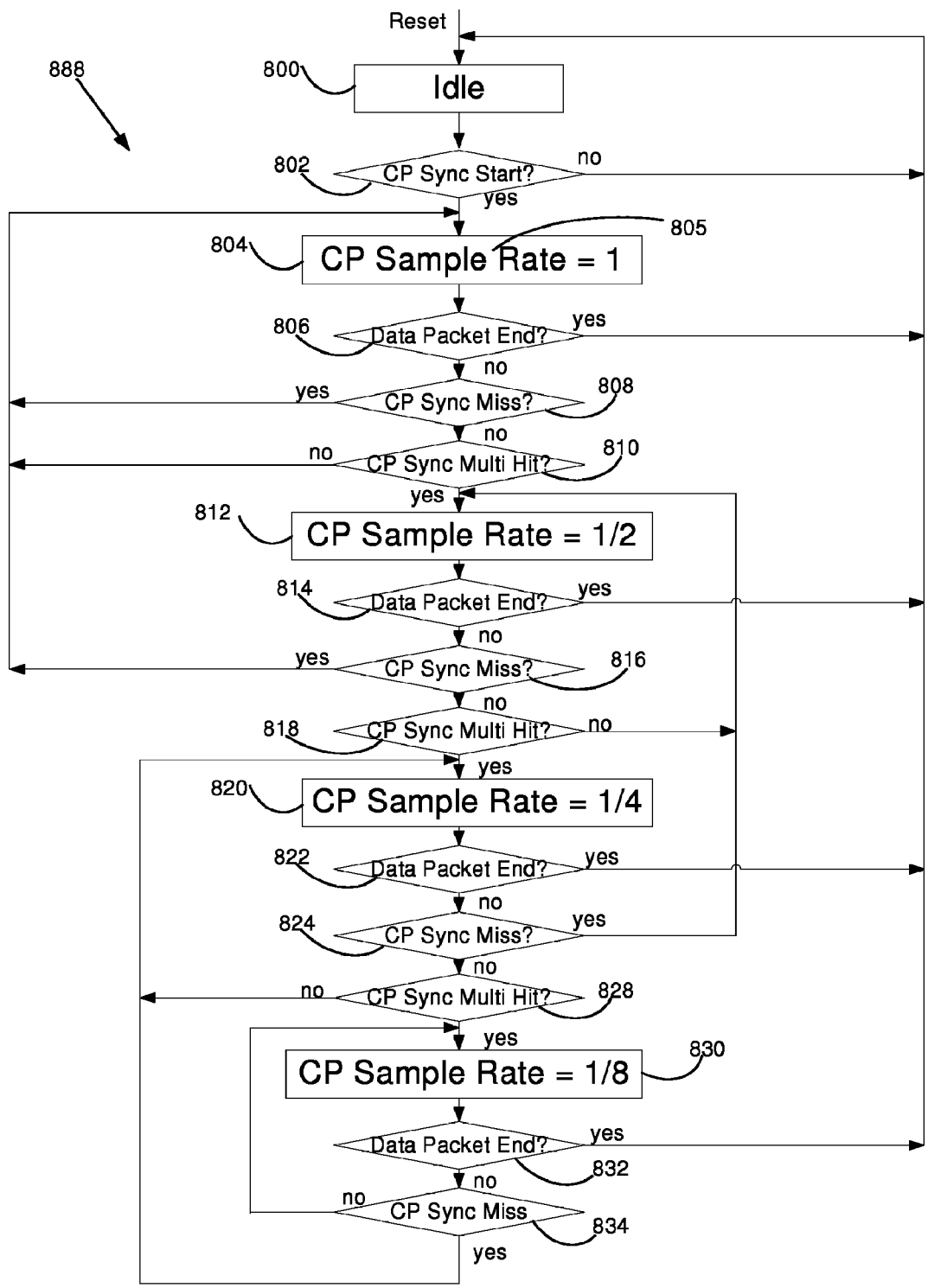
FIG. 8 is a flow chart for one embodiment of CP rate controller of FIG. 5, according to the present invention.

FIG. 8 shows a flowchart method 888 for one embodiment of CP rate controller 506 according to the present invention. The present embodiment uses sample rate reduce factor 308 equal but is not limited to ½ for symbol synchronization. The sample rate reduce factor 308 is store in control register 400 and may be changed to any value at any time during synchronization.

Method 888 initially sets CP sample rate 805 equivalent to input data rate, and modifies the sample rate according to symbol synchronization statuses dynamically. The sample rate 805 is increased by a factor equal to the invert of sample rate reduce factor 308 whenever the synchronization fails to detect a CP 114 sequence (a miss). However, if a predetermined number of previous synchronizations detects a CP 114 sequence successfully (a multiple hit), then the sample rate 805 decreased by sample rate reduce factor 308.

In step 802, if a start signal from sync control state machine 606 is detected, method 888 proceeds to step 804, a sample rate 805 equivalent to input data rate is set by default. If a start signal is not detected, the method returns to 800. In step 806, method 888 determines weather a packet end signal from packet controller 600 is detected. If the packet end signal is not detected, method 888 proceeds to step 808. However, if the packet end signal is detected, the method returns to step 800. In step 808, method 888 determines weather the synchronization is a miss. If the synchronization is a miss, method 888 returns to step 804. However, if synchronization is a hit, then the method continues with step 810. In step 810, if the synchronization is a multiple hit, method 888 proceeds to step 812. In step 812, the sample rate 805 is reduced by sample rate reduce factor 308, and the sample rate is equal to ½ of the full sample rate in the present embodiment. The method continues with step 804 if the synchronization is not a multiple hit.

In step 814, method 888 determines weather a packet end signal from packet controller 600 is detected. If the packet end signal is not detected, method 888 proceeds to step 816. If the packet end signal is detected, the method returns to step 800. In step 816, method 888 determines weather the synchronization is a miss. If the synchronization is a miss, method 888 returns to step 804 and the sample rate is double in the present embodiment. However, if synchronization is a hit, then the method continues with step 818. In step 818, if the synchronization is a multiple hit, method 888 proceeds to step 820. In step 820, the sample rate is reduced again by sample rate reduce factor 308, and the sample rate is equal to ¼ of the full sample rate in the present embodiment. The method continues with step 812 if synchronization is not a multiple hit.

In step 822, method 888 determines weather a packet end signal from packet controller 600 is detected. If the packet end signal is not detected, method 888 proceeds to step 824. If the packet end signal is detected, the method returns to step 800. In step 824, method 888 determines weather the symbol synchronization is a miss. If the synchronization is a miss, method 888 returns to step 812. The sample rate is double in the present embodiment. However, if synchronization is a hit, then the method continues with step 828. In step 828, if the synchronization is a multiple hit, method 888 proceeds to step 830. In step 830, the sample rate is reduced again by sample rate reduce factor 308. The sample rate is equal to ⅛ of the full sample rate in the present embodiment. The method continues with step 820 if synchronization is not a multiple hit.

In step 832, method 888 determines weather a packet end signal from packet controller 600 is detected. If the packet end signal is not detected, method 888 proceeds to step 834. However, if the packet end signal is detected, the method returns to step 800. In step 834, method 888 determines weather the symbol synchronization misses a CP 114 sequence. If the synchronization is a miss, method 888 proceeds to step 820. The sample rate is double in the present embodiment. However, if synchronization is a hit, then the method continues with step 830. The minimum sample rate is ⅛ of input data rate in the present embodiment. The sample rate is updated dynamically and constantly until synchronization of the whole packet is complete.

Figure 9:
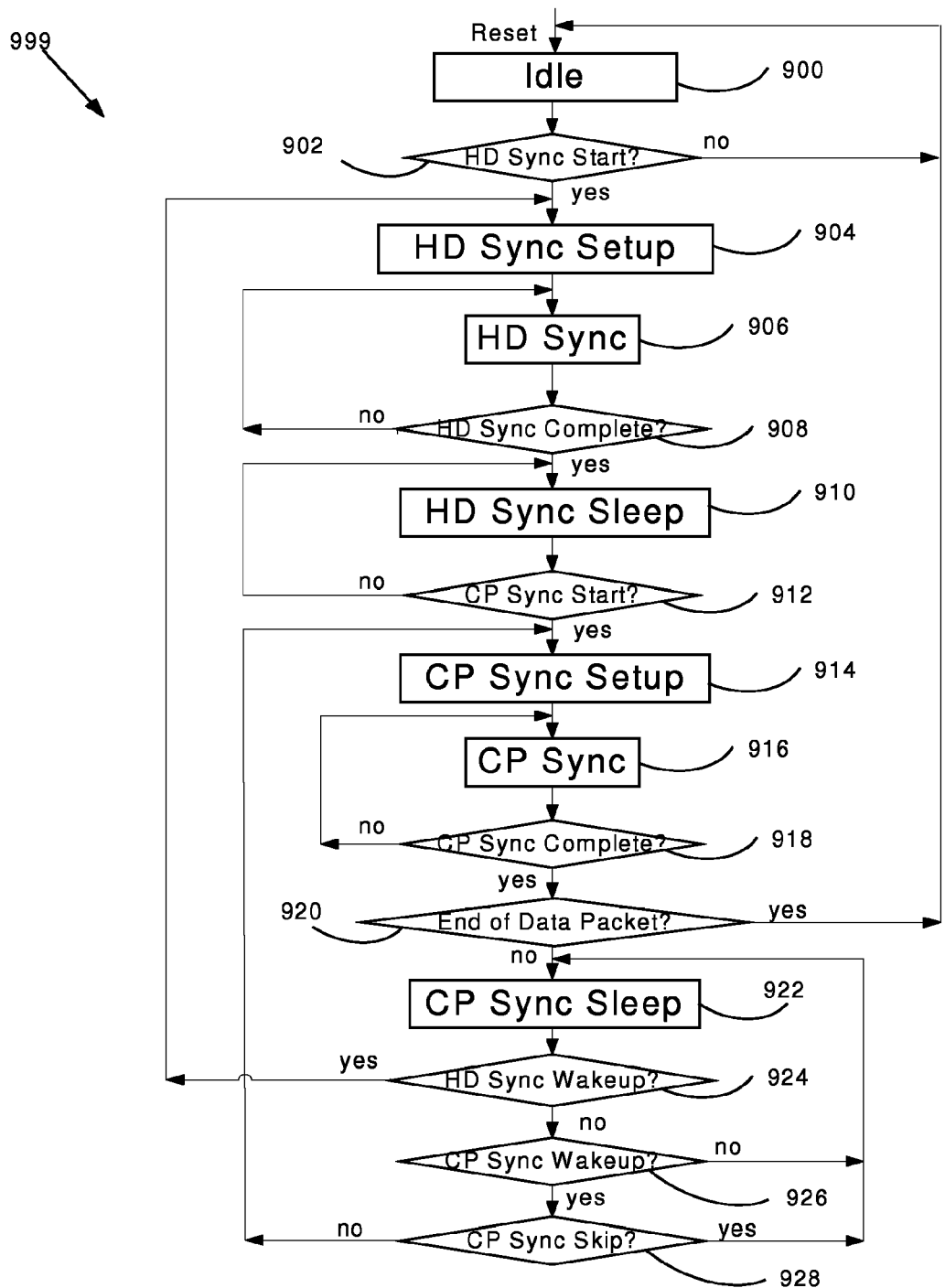
FIG. 9 is a flow chart for one embodiment of sync control state machine of FIG. 6, according to the present invention.

FIG. 9 shows a flowchart method 999 for one embodiment of sync control state machine 606. Sync control state machine 606 controls and schedules all synchronization operations. Initially, in step 900, method 999 waits for packet start signal from packet controller 600. In step 902, if a packet start signal is not detected, the method returns to step 900. However, if a packet start signal is detected, method 999 proceeds to step 904. In step 904, sync setting 402 updates parameters for frame synchronization in current setting 504 and proceeds to step 906. In step 906, method 999 performs frame (HD) synchronization by searching and correlating sync sequence 110 in input data. In step 908, method 999 determines weather the frame synchronization is complete. The synchronization is complete when correlation data sequence passes through a sync window 300. If the synchronization is not complete, method 999 continues with step 906. However, if the synchronization is complete, the method increments HD counter 604 and proceeds to step 910. At the mean time, method 999 activates and sets HD wakeup timer 602 with HD idle delay 310 and CP wakeup timer 608 with CP idle delay 312. The timers send wake up signals to method 999 when the timers expire. Generally, HD idle delay 310 is much longer than CP idle delay 312.

In step 910, method 999 waits for a wakeup signal from CP wakeup timer 608. Sync pipeline 406 is shutdown during this period to reduce power consumption. In step 912, method 999 determines weather a wakeup signal from CP wakeup timer 608 is detected. If the wakeup signal is detected, method 999 resets CP wakeup timer 608 and proceeds to step 914. However, if the wakeup signal is not detected, method 999 continues with step 910. In step 914, sync setting 402 updates parameters for symbol synchronization in current setting 504 and proceeds to step 916. In step 916, method 999 performs symbol synchronization by searching and correlating CP 114 in the input data. In step 918, method 999 determines weather the synchronization is complete. If the synchronization is not complete, method 999 continues with step 916. If the synchronization is complete, the method proceeds to 920. In step 920, method 999 determines weather the whole data packet has been processed. If packet end signal from packet controller 600 is detected, method 999 proceeds to step 900. However, if packet end signal is not detected, method 999 increments CP counter 610, activates and sets CP wakeup timer 608 with CP idle delay 312 and continues with step 922.

In step 922, method 999 shut down sync pipeline 406 to reduce power consumption and waits for wakeup signal from CP wakeup timer 608. In step 924, method 999 determines weather a wakeup signal from HD wakeup timer 602 is detected. If HD wakeup signal is detected, method 999 clears HD wakeup timer 602 and proceeds to step 904 and starts a next frame synchronization. However, if the wakeup signal is not detected, method 999 proceeds to step 926. In step 926, method 999 determines weather the wakeup signal from CP wakeup timer 608 is detected. If CP wakeup signal is detected, method 999 clears CP wakeup timer 608 and proceeds to step 928. However, if the CP wakeup signal is not detected, method 999 continues with step 922. In step 928, if the averages of timing and frequency offsets from a plurality of previous symbol synchronizations are below predetermined thresholds, method 999 increments CP counter 610, activates and sets CP wakeup timer 608 with CP idle delay 312, and proceeds to step 922 to skip one symbol synchronization. However, if the averages are higher than predetermined thresholds, method 999 continues to step 914 and starts a next symbol synchronization. The processes continue until the end of data packet.

Figure 10:
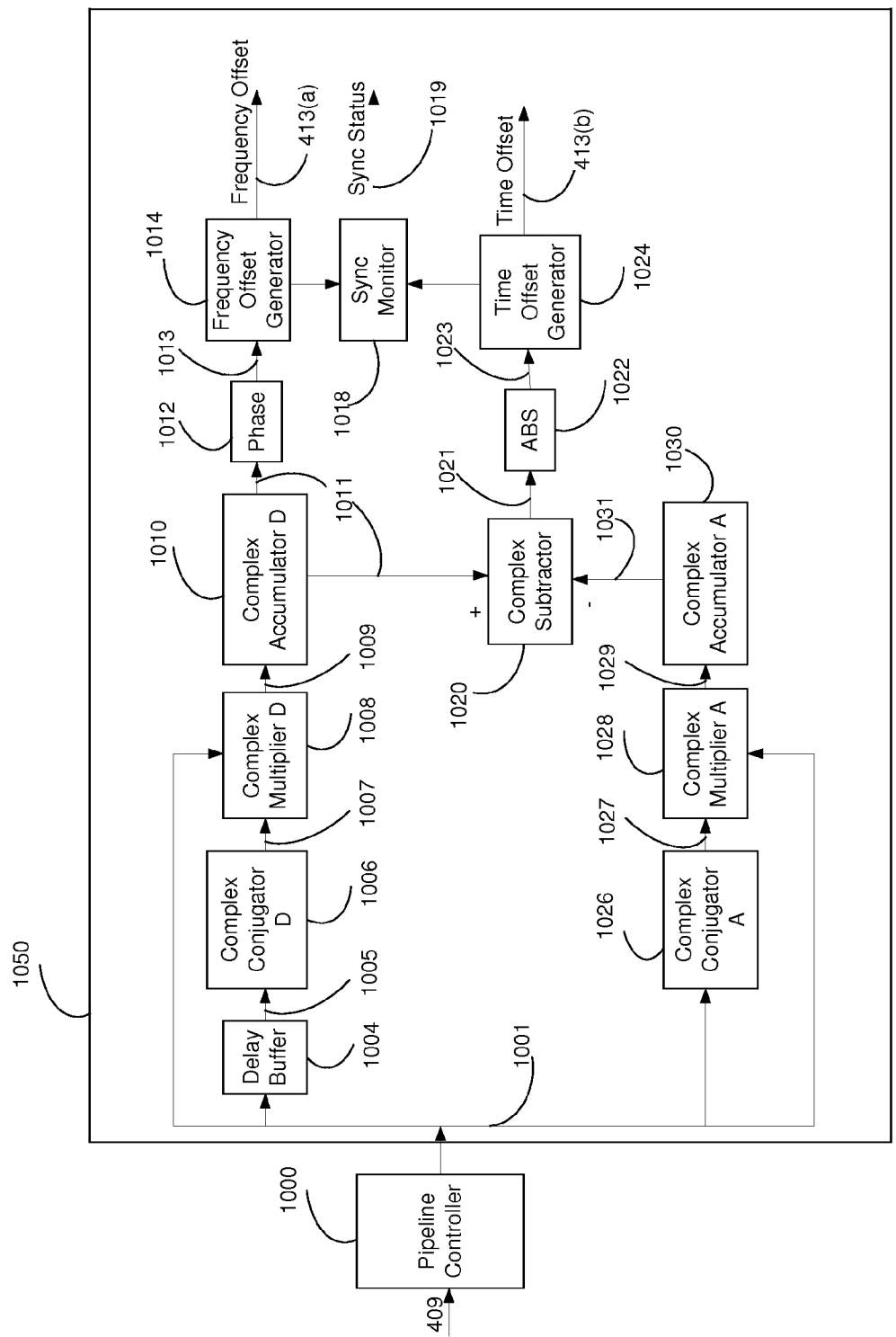
FIG. 10 is a block diagram for one embodiment of sync pipeline of FIG. 4, according to the present invention.

FIG. 10 shows a block diagram for one embodiment of sync pipeline 406. Sync pipeline 406 includes, but is not limited to, a pipeline controller 1000 and a correlation pipeline 1050. The correlation pipeline 1050 further includes, but is not limited to, a delay buffer 1004, a complex conjugator D 1006, a complex multiplier D 1008, a complex accumulator D 1010, an complex phase module 1012, a frequency offset generator 1014, a sync monitor 1018, a complex substractor 1020, a complex absolute value module 1022, time offset generator 1024, a complex conjugator A 1026, a complex multiplier A 1028, and a complex accumulator A 1030. Correlation pipeline 1050 correlates two redundant sync sequences 110 and estimates frame 100 timing and frequency offsets during frame synchronization. The offsets are sent to data corrector 410 for frame data timing and frequency adjustments. During Symbol synchronization, two redundant CP 114 sequences are correlated to estimate symbol 106 timing and frequency offsets. The offsets are sent to data corrector 410 for symbol data timing and frequency adjustments.

During the correlation, pipeline controller 1000 samples input data 409 from data buffer 408 with variable sample rates dictated by sync setting 402. Pipeline controller 1000 turns on correlation pipeline 1050 during synchronization and turns off correlation pipeline 1050 when synchronization is complete. Pipeline controller 1000 adjusts sync widow 300, sync sequence length 302 and sync delay 304 based on the sample rate. The sample data 1001 is store in delay buffer 1004 and is complex conjugated in complex conjugator D 1006. The output 1007 is multiplied with sampled data 1001 in complex multiplier D 1008. The result 1009 is accumulated in complex accumulator D 1010.

At the mean time, the sample data 1001 is complex conjugated in complex conjugator A 1026. The output 1027 is multiplied with sample data 1001 in complex multiplier A 1028. The result 1029 is accumulated in complex accumulator A 1030. Complex subtractor 1020 subtracts output 1031 of complex accumulator A 1030 from output 1011 of complex accumulator D 1010. Maximum absolute value of subtractor output 1021 is taken in ABS module 1022 and timing offset 413(*b*) is generated in timing offset generator 1024. Complex phase 1012 takes output 1011 of complex accumulator D 1010 to calculate maximum complex phase 1013. Frequency offset generator 1014 generate frequency offset 413(*a*) from the maximum complex phase 1013. Sync monitor 1018 generates current status 1019 by monitoring the activities of frequency offset generator 1014 and timing offset generator 1024. Sync status 500 updates the current setting 504 according to the current status 1019.

Figure 11:
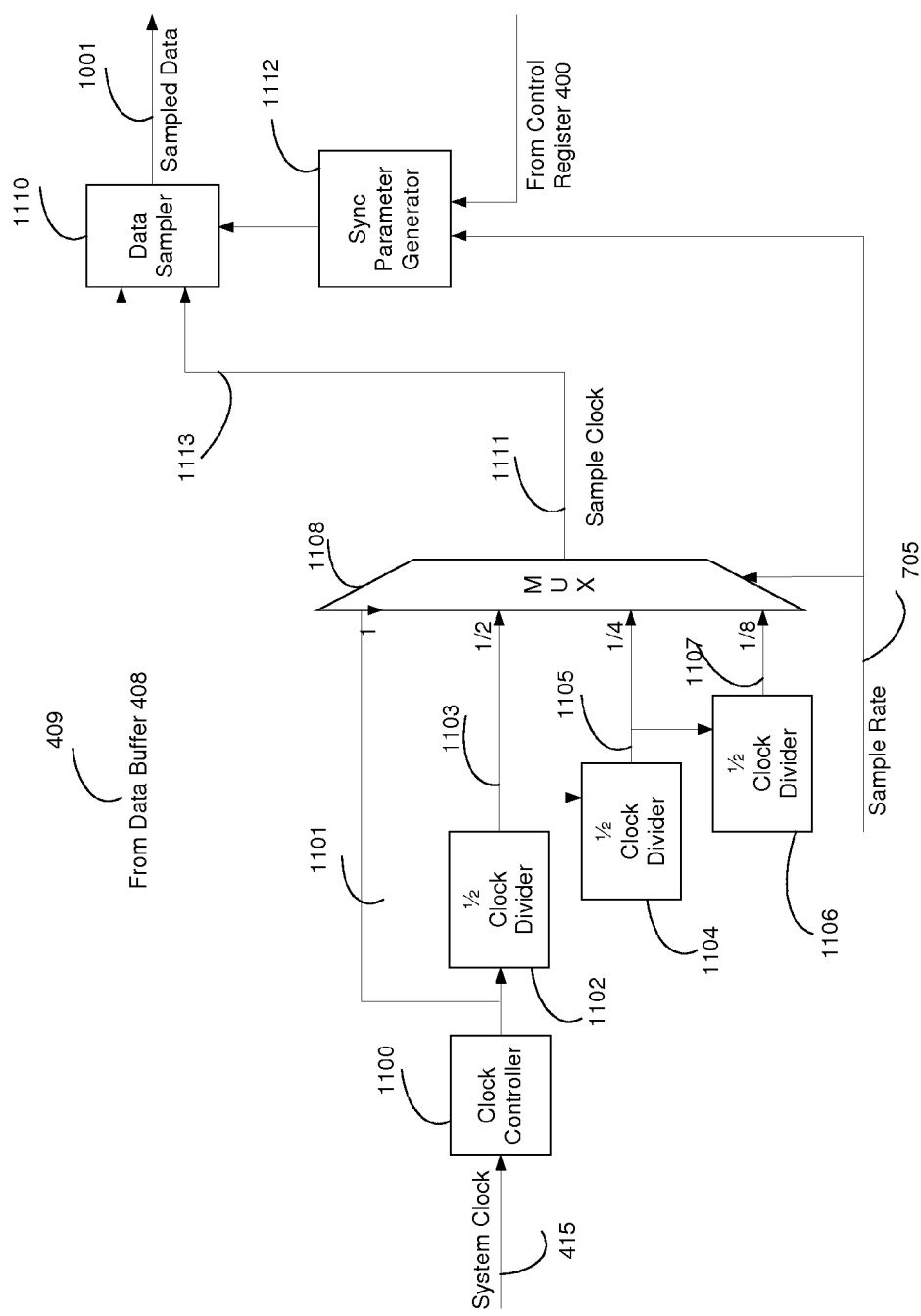
FIG. 11 is a block diagram for one embodiment of pipeline controller of FIG. 10, according to the present invention.

FIG. 11 shows a block diagram for one embodiment of pipeline controller 1000. The present embodiment uses sample rate reduce factor 308 equal but is not limited to ½, and the reduce factor 308 may be changed at any time during synchronization. Pipeline controller 1000 includes, but is not limited to, a clock controller 1100, a ½ clock divider 1102, a ½ clock divider 1104, a ½ clock divider 1106, a multiplexer (MUX) 1108, a data sampler 1110 and a sync parameter generator 1112.

Clock control 1100 shunts down system clock 415 when sync control state machine 606 completes frame or Symbol synchronization in step 910 or step 922. The system clock 415 is turned on when HD wakeup timer 602 or CP wake up timer 608 awakes sync control state machine 606 in step 912, 924 or 926. The output 1101 of clock controller 1100 is divided by a series of ½ clock divider 1102, 1104 and 1106 to generate ½ clock frequency 1103, ¼ clock frequency 1105 and ⅛ clock frequency 1107. The sample clock 1111 equal to 1, ½, ¼ and ⅛ of system clock 415 frequency is selected in MUX 1108 according to HD sample rate 705 or CP sample rate 805. Data sampler 1110 samples data 409 from data buffer 408 and output sampled data 1001 for correlation. Sync parameter generator 1112 recalculates and adjusts sync window 300, sync sequence length 302, and sync delay 304 according the HD sample rate 705 or CP sample rate 805.

What is claimed is:

1. A system for reducing power consumption of signal synchronization circuit in an Orthogonal Frequency Division Multiplexing (OFDM) receiver comprising:
    a sync setting configured to change correlation data sample rate and synchronization parameters setting dynamically according to synchronization statuses and results;
    a sync pipeline configured to execute signal correlation with scalable synchronization window size, synchronization sequence length, synchronization delay and variable data sample rate, and to execute power on and off requests; and a sync controller configured to control frame and symbol synchronization operation flows, schedule synchronization timing, turns on and off the sync pipeline based on the operation flows,
    wherein the sync controller turns on power of the sync pipeline and starts symbol synchronization after frame synchronization is complete and a predetermined duration expires, turns off power of the sync pipeline when symbol synchronization is complete, and repeats the cycle until a predetermined number of symbols in a frame have been synchronized, and wherein the sync controller skips a plurality of frame or symbol synchronizations to reduce power consumption of the sync pipeline if averages of coarse timing and fine frequency offsets from a plurality of previous synchronizations are below predetermined thresholds.

2. The system of claim 1, wherein the sync setting starts with a predetermined correlation data sample rate, increases the data sample rate by a predetermined factor if a previous synchronization misses a sync sequence, and decreases the data sample rate by a predetermined factor if a plurality of previous synchronizations detect a sync sequence successfully.

3. The system of claim 1, wherein the sync pipeline further includes a pipeline controller and correlation pipeline.

4. The system of claim 3, wherein the pipeline controller further includes a clock controller, a series of clock dividers, a sync parameter generator and a data sampler.

5. The system of claim 4, wherein the clock controller turns on and off system clock dictated by the sync controller, the clock dividers generate correlation data sample clock based on sample rate provided by the sync setting, and the sync parameter generator scales synchronization window, synchronization sequence length and synchronization delay based on the sample rate, and the data sampler samples the correlation data with the adjusted parameters and setting.

6. The system of claim 5, wherein the system clock powers on the correlation pipeline when turned on and powers off the correlation pipeline when turned off.

7. The system of claim 1, wherein the sync controller performs multiple levels of coarse timing and fine frequency synchronizations.

8. The system of claim 1, wherein the sync controller starts frame synchronization after receiving packet start signal or completing synchronization of a predetermined number of symbols in a frame, turns off power of the sync pipeline when frame synchronization is complete.

9. A method for reducing power consumption of signal synchronization circuit in an Orthogonal Frequency Division Multiplexing (OFDM) receiver comprising the steps of:
storing synchronization parameters, including correlation data sample rate, in a sync setting, changing the data sample rate and parameters dynamically based on synchronization statuses and results; performing signal correlation with scalable synchronization window size, synchronization sequence length, synchronization delay and variable data sample rate, using a sync pipeline, and turning on and off the power of the sync pipeline upon request; and controlling frame and symbol synchronization operation flows, scheduling synchronizations timing, and turning on and off the sync pipeline based on the operation flow using a sync controller, wherein the sync controller turns on power of the sync pipeline and starts symbol synchronization after frame synchronization is complete and a predetermined duration expires, turns off power of the sync pipeline when symbol synchronization is complete, and repeats the cycle until a predetermined number of symbols in a frame have been synchronized, and wherein the sync controller skips a plurality of frame or symbol synchronizations to reduce power consumption of the sync pipeline if average timing and frequency offsets from a plurality of previous synchronizations are below predetermined thresholds.

10. The method of claim 9, wherein the sync setting starts with a predetermined correlation data sample rate, increases the data sample rate by a predetermined factor if a previous synchronization misses a sync sequence, and decreases the data sample rate by a predetermined factor if a plurality of previous synchronizations detect a sync sequence successfully.

11. The method of claim 9, wherein the sync pipeline further includes a pipeline controller and correlation pipeline.

12. The method of claim 11, wherein the pipeline controller further includes a clock controller, a series of clock dividers, a sync parameter generator and a data sampler.

13. The method of claim 12, wherein the clock controller turns on and off system clock dictated by the sync controller, the clock dividers generate data sample clock according to sample rate provided by the sync setting, the sync parameter generator adjusts synchronization window, synchronization sequence length and synchronization delay according to the sample rate, and the data sampler samples the correlation data with the adjusted parameters and setting.

14. The method of claim 13, wherein the system clock powers on the correlation pipeline when turned on and powers off the correlation pipeline when turned off.

15. The method of claim 9, wherein the sync controller performs multiple levels of timing and frequency synchronizations.

16. The method of claim 9, wherein the sync controller starts flame synchronization after receiving packet start signal or completing synchronization of a predetermined number of symbols in a frame, turns off power of the sync pipeline when frame synchronization is complete.

* * * * *